H. G. KELLER.
HOG CATCHING TOOL.
APPLICATION FILED APR. 22, 1916.
1,272,050.
Patented July 9, 1918.
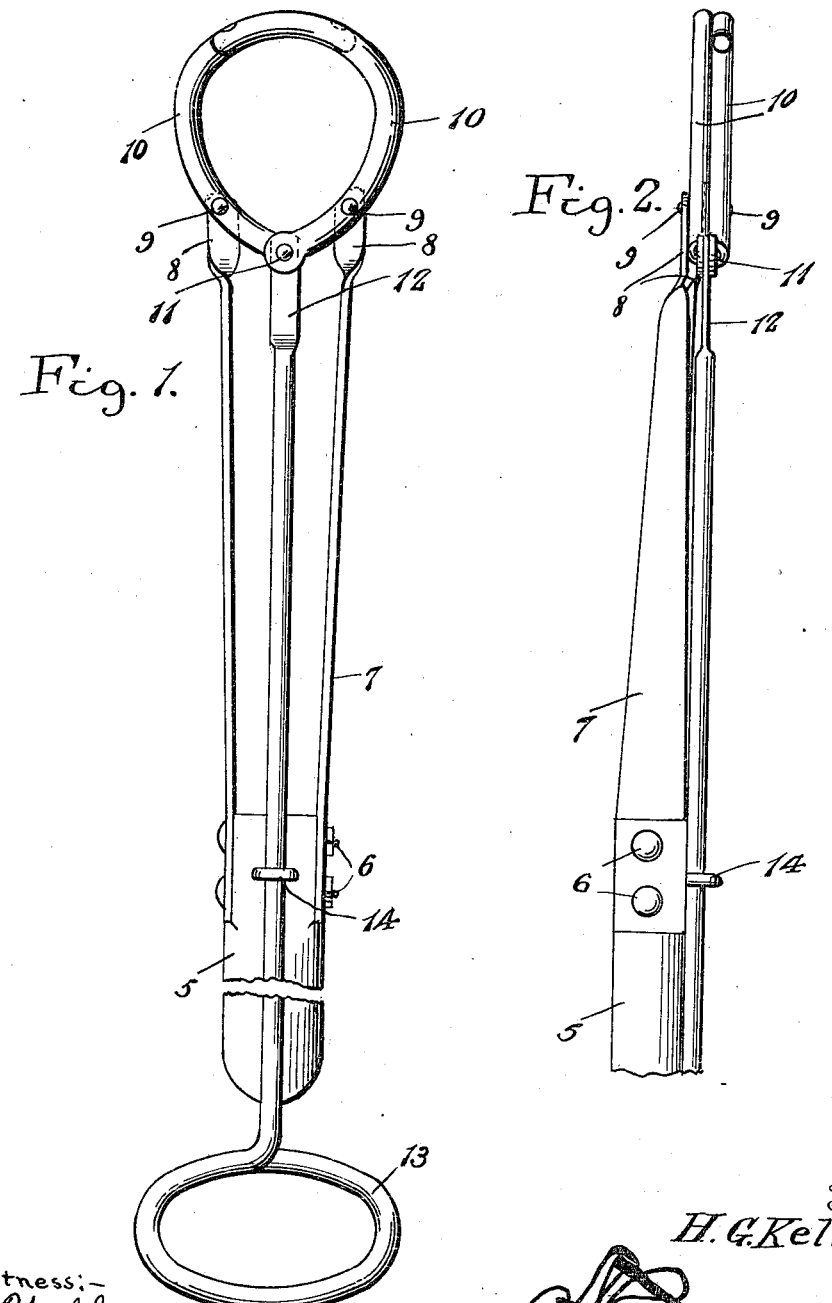

UNITED STATES PATENT OFFICE.

HENRY G. KELLER, OF OWASCO, INDIANA.

HOG-CATCHING TOOL.

1,272,050.

Specification of Letters Patent.  Patented July 9, 1918.

Application filed April 22, 1916.  Serial No. 92,913.

*To all whom it may concern:*

Be it known that I, HENRY G. KELLER, a citizen of the United States, residing at Owasco, in the county of Carroll and State of Indiana, have invented certain new and useful Improvements in Hog-Catching Tools; and I do hereby declare the following to be a full, clear, and exact description of the invention, such as will enable others skilled in the art to which it appertains to make and use the same.

This invention has for its object to provide a simple and efficient tool especially designed for catching hogs and embodying a pair of pivoted jaws and an actuating rod connected therewith in such manner that a longitudinal pull upon the rod effects a closing movement of the jaws.

With this and other objects in view, the invention consists in the novel construction, combination and arrangement of parts as will be hereinafter specifically described, claimed and illustrated in the accompanying drawing, in which:

Figure 1 represents a plan view of the hog catching tool partly broken away, and Fig. 2 represents a side elevation thereof.

Referring to the drawing in detail, wherein similar reference numerals designate corresponding parts throughout the several views, the numeral 5 indicates a supporting plate which may be constructed of wood, metal or any other suitable material, and is of such size, as suggested in the accompanying drawing, as to be conveniently grasped in one hand of the operator. The plate or handle 5 is rigidly secured at one end by bolts or equivalent means 6 to a pair of outwardly diverging spaced side members 7, having the free terminals 8 twisted and provided with pins 9, whereby a pair of jaws 10 are pivotally secured adjacent their ends thereto. The free ends of the jaws 10 are adapted, when closed, to overlap, as clearly shown in Fig. 1, so as to embrace the leg of a hog. The extreme inner ends of the jaws are pivotally connected at 11 upon opposite sides of an actuating rod 12, which latter is extended longitudinally between the side members 7 and along the supporting plate or handle 5, the outer terminal thereof being provided with a loop 13 constituting a handle which may be used, in connection with the handle 5 to hold the tool when in use. A suitable number of loops or staples 14 are rigidly secured to the supporting plate 5 and between the rod 12 for guiding the latter.

What I claim is:

A hog catching tool comprising an elongated supporting plate, a pair of side members having one of their ends secured to the opposite sides of the plate and extending outwardly beyond one end thereof and their free ends being twisted, an actuating rod slidably mounted on one face of said plate, a pair of arcuate jaws each having one end pivotally secured to one end of the rod, said twisted ends of the side members being pivotally secured to each jaw adjacent the pivotal connections of the jaws with the rod, and a loop formed integral with the free end of the rod to facilitate the opening and closing movement of the jaws, as and for the purpose specified.

In testimony whereof I affix my signature in presence of two witnesses.

HENRY G. KELLER.

Witnesses:
PETER W. LEWIS,
JAMES MOORE.

Copies of this patent may be obtained for five cents each, by addressing the "Commissioner of Patents, Washington, D. C."